United States Patent [19]
Kates et al.

[11] 3,786,635
[45] Jan. 22, 1974

[54] INTERNAL COMBUSTION ENGINE WITH MODIFIED AND CONTROLLED EXHAUST

[75] Inventors: Frank F. Kates, Irvine; George E. Faber, Santa Ana, both of Calif.

[73] Assignee: Krun Corporation, Santa Fe Springs, Calif.

[22] Filed: Dec. 20, 1971

[21] Appl. No.: 210,006

[52] U.S. Cl. ........... 60/278, 60/297, 60/310, 60/302, 60/900, 55/DIG. 30, 123/119 A
[51] Int. Cl. ............ F02m 25/06, F01n 3/04
[58] Field of Search ..... 60/278, 279, 297, 310, 311, 60/302, 900; 123/119 A, 124 R; 55/DIG. 30

[56] References Cited
UNITED STATES PATENTS

| | | | |
|---|---|---|---|
| 2,673,446 | 3/1954 | Salardi | 60/279 |
| 3,641,767 | 2/1972 | Kraus | 123/124 R |
| 2,738,854 | 3/1956 | Thrower | 60/311 |
| 3,035,561 | 5/1962 | Siegler | 60/278 |
| 3,124,930 | 3/1964 | Powers | 60/302 |
| 3,353,336 | 11/1967 | Caballero | 60/310 |
| 3,548,591 | 12/1970 | McKay | 60/311 |
| 3,556,734 | 1/1971 | Peterson | 181/36 C |
| 3,618,576 | 11/1971 | Dixon | 123/119 A |

FOREIGN PATENTS OR APPLICATIONS

| | | | |
|---|---|---|---|
| 829,676 | 1/1952 | Germany | 123/119 A |

*Primary Examiner*—Douglas Hart
*Attorney, Agent, or Firm*—Charles E. Wills

[57] ABSTRACT

The exhaust gases and fluids from an internal combustion engine which is using gasoline and air as fuel, are passed through a metal screen and a bed of activated carbon whereby a modification of the gases occur, and thence through a condenser where water and solids are removed therefrom, with from zero to about twenty (20 percent) percent of the gases leaving the condenser being exhausted to atmosphere and the remainder thereof being returned to the engine for reuse in the combustion process.

7 Claims, 2 Drawing Figures

INTERNAL COMBUSTION ENGINE WITH MODIFIED AND CONTROLLED EXHAUST

BACKGROUND OF THE INVENTION

The present invention relates generally to the power generating art, and more particularly to a novel internal combustion engine with modified and controlled exhaust, usable as a power plant, a stationary engine or as the prime mover in various types of vehicles.

At the present time there is considerable concern in the United States and throughout the world regarding pollution, and particularly the pollution of the atmosphere by equipment which burns hydrocarbon fuel for energy.

The primary area of concern is the large number of gasoline-burning automobiles which are used in urban areas, and which are believed to be primarily responsible for the "smog" which blankets many large cities due to the carbon monoxide, carbon dioxide, aldehydes, and nitrogen compounds which are emitted from their exhaust manifolds.

Efforts have been made and are being made to change the additives used with gasolines, as by reducing the amount of lead compounds, but it is recognized that it is questionable whether the reduction of the lead compound additives makes any appreciable difference in the "smog" level in major cities in the United States.

Also, various legislative bodies have demanded of the automobile manufacturers that they produce a smog-free engine, but it is indicated that automobile manufacturers are of the opinion that this could not be achieved in less than possibly 10 years, if at all.

In our copending application, Ser. No. 161,820, filed July 12, 1971 now abandoned, there is a disclosed closed circuit internal combustion engine in which the system is fully closed so that there is no gaseous exhaust to the atmosphere.

Although we have experienced considerable success with the aforementioned "exhaust-less" engine, the power output thereof is not as high as we have desired.

SUMMARY OF THE INVENTION

With the foregoing pollution problems in mind, it is an object of the present invention to provide a novel internal combustion engine with modified and controlled exhaust, which does not pollute the atmosphere with any noxious or harmful pollutants. More particularly, it is an object to provide such an engine which can be operated fully closed insofar as the exhaust to atmosphere is concerned, or which can be operated with only a partial venting of the exhaust of the engine to the atmosphere, i.e. in the neighborhood of up to about twenty (20 percent) percent, which exhaust to the atmosphere contains practically no noxious or harmful pollutants.

Another object is to provide a novel internal combustion engine which emits practically no noxious or harmful pollutants into the atmosphere, and which can operate using any conventional gasoline fuel, either leaded or unleaded.

Yet another object is to provide such an internal combustion engine which emits practically no noxious or harmful pollutants into the atmosphere, and which has a power output comparable to the power output of internal combustion engines presently in use and which emit substantially all of the exhaust to the atmosphere.

A further object of the present invention is to provide an internal combustion engine which emits practically no noxious or harmful pollutants into the atmosphere, and which is very similar in construction to internal combustion engines which are presently used in automobiles and trucks. More particularly, it is an object to provide such an engine which can be produced using presently available blocks, pistons, valves, and the like. Specifically, it is an object of the present invention to utilize the presently known internal combustion engines (both reciprocating and rotary) as one of the basic components of our novel internal combustione engine, whereby less time and money will be required for producing an engine embodying the present invention, and pollution of the atmosphere can be practically eliminated within a very short period of time using the present manufacturing methods and internal combustion engine components.

Yet another object is to provide such a novel internal combustion engine which can utilize presently known hydrocarbon fuels, including gasolines containing various types, of anti-knock lead compounds, without polluting the atmosphere. More particularly, it is an object to provide such an engine which can utilize fuels containing whatever additives are most beneficial from a standpoint of smoother operation and more power, without regard for the components in the exhaust.

We have discovered that the aforementioned objects are fulfilled by an internal combustion engine containing a plurality of combustion chambers adapted to receive a charge of hydrocarbon fuel and oxygen for ignition; one or more containers provided with activated carbon positioned in close proximity with the exhaust tubes of the engine and through which the exhaust gases are passed; metal screens interposed in the aforementioned tubes between the engine block and the containers of carbon; and a condenser unit containing baffle plates and a cooling coil through which the exhaust gases from the engine are passed to remove water and/or other liquids and solids from the exhaust; with all or a major portion of the remaining exhaust gases being returned to the carburetor of the engine for recycling with additional fuel and a limited amount of air.

DESCRIPTION OF THE PREFERRED EMBODIMENTS

Figure 1:
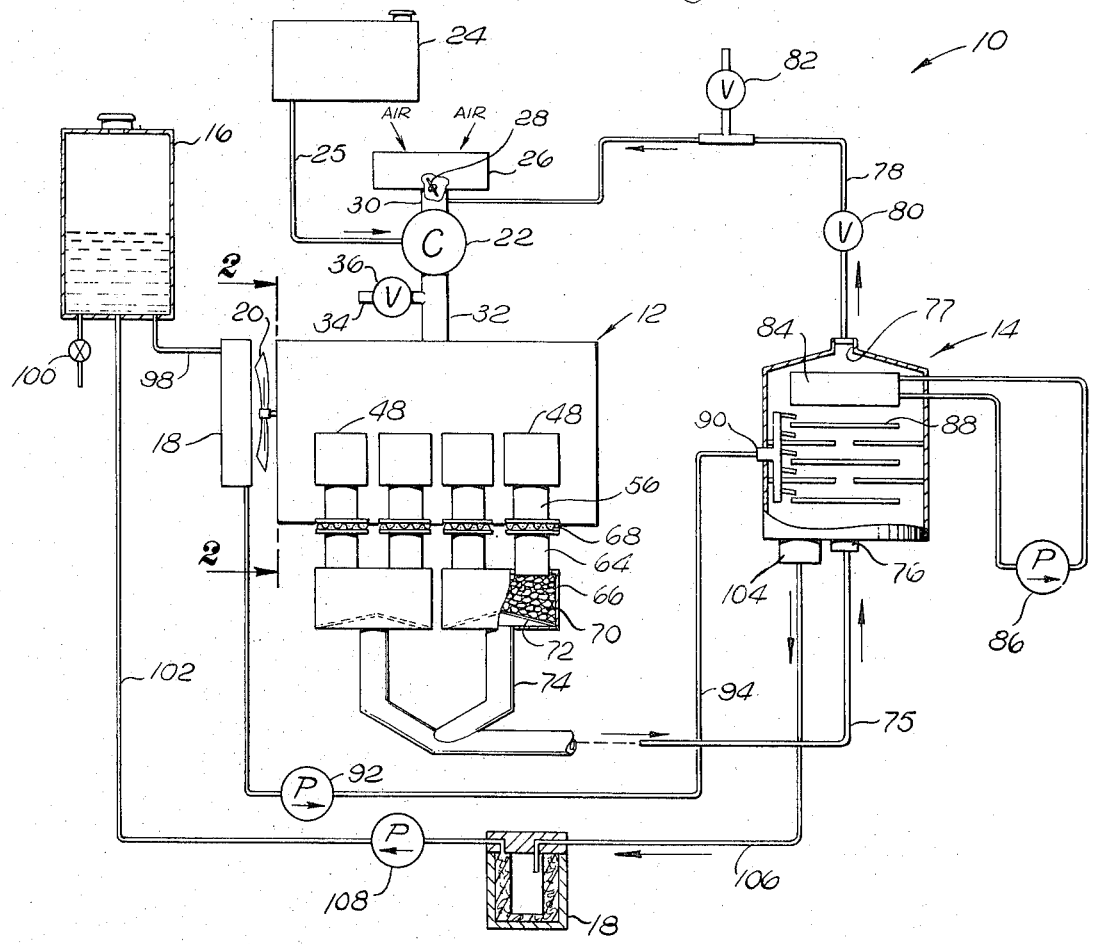
FIG. 1 is a schematic drawing of one form of internal combustion engine embodying the teachings of the present invention, as viewed from one side of the engine block.

Referring to the drawing more particularly by reference numerals, the number 10 indicates generally a novel internal combustion engine with modified and controlled exhaust embodying the teachings of the present invention, and which includes an internal combustion engine 12, a condenser unit 14, a liquid storage tank 16, and a filter 18.

Although either reciprocating or rotary type internal combustion engines can be used, for purposes of illustration the engine 12 is a V-8 engine of conventional construction (such as a 1962 Chevrolet 327 V-8) with a 10/1 compression ratio in the cylinders, and which includes conventional pistons, valves, valve stems, and an ignition system (not shown), a conventional radiator 18 and a fan 20, a conventional carburetor 22 which receives liquid hydrocarbon fuel from a fuel tank 24 through a tube 25, and an air inlet and filter assembly 26 provided with a control valve 28 and which is in communication with the carburetor 22 through a fuel pipe 30.

A pipe 32 interconnects the carburetor 22 with the intake manifolds (not shown), said pipe being provided with an air inlet 34 containing a valve 36 for adjusting the amount of air which can be admitted into the system downstream of the carburetor and before the gas-fuel mixtures enters the combustion chambers of the engine.

Figure 2:
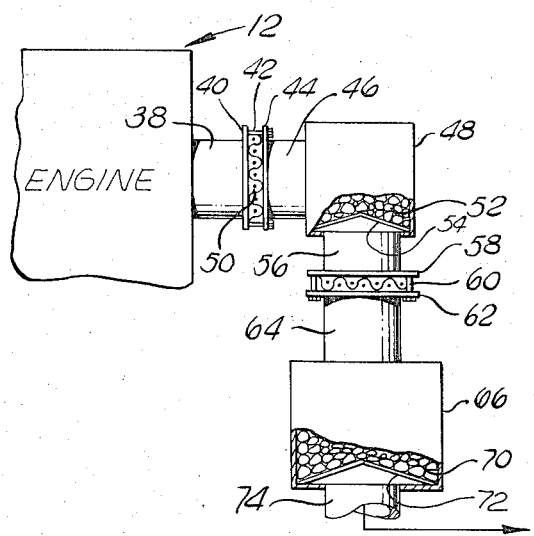
FIG. 2 is an end view of the engine, taken on the line 2—2 in FIG. 1.

The conventional exhaust manifold on each side of the engine is replaced with relatively short, individual exhaust tubes 38 (FIG. 2) having flanges 40 adjacent their outer ends, said flanges being joined by bolts 42 to similarly shaped flanges 44 on the outer ends of tubes 46, each of the later being in communication with a box-like container 48.

Positioned between each set of flanges 40 and 44 so as to extend across the passageways between the engine block and each of the containers 48, is a metal screen 50, which can be made from iron, nickel, chromium, monel, vanadium or stainless steel, or a mixture thereof. We have satisfactory operated the engine with screens made from each of the aforementioned metals.

Each of the containers 48 is provided with discrete pieces of activated carbon 52 ranging from pea-size to pieces as large as a walnut, and, if desired, a perforate barrier 54 can be provided adjacent the outlet from the container 48 to prevent the pieces of carbon from falling or being blown therefrom.

Connected to the bottom of each of the containers 48 is a tube 56 which has a flange 58 adjacent the bottom end thereof, each of said flanges being interconnected by bolts 60 with a similarly-shaped flange 62 on the end of another tube 64 which, in turn, is in communication with a double-container 66.

Positioned between each set of flanges is a second metal screen 68 made from any of the metals referred to hereinabove with respect to the screens 50.

In the preferred embodiment, each of the containers 66 is of a size to receive two of the tubes 64 (FIG. 2), and each is provided with similar pieces of activated carbon 70. Here again, if desired, a perforate barrier 72 can be provided in the bottom of each double-container to prevent the pieces of carbon from falling or being blown therough the outlet thereof.

It is to be understood that the two double-containers 60 could be replaced with four separate containers or with a single large container for receiving all of the tubes 64. The main object is to have a bed of activated carbon particles over which the exhaust gases flow, with metal screens in the passageways between the exhaust ports of the engine and the carbon bed.

As shown in FIG. 1, a plurality of exhaust tubes 74 extend from the double-containers and are joined together at a common exhaust pipe 75 which is in communication with an inlet 76 at the lower end of the condenser unit 14.

Extending from an outlet 77 at the upper end of the condenser unit, is an outlet pipe 78 which is in communication with the fuel tube 30 between the air inlet 26 and the carburetor 22.

Positioned in the pipe 78 are a control valve 80 for varying the back pressure on the engine, and a vent valve 82 for venting a percentage of the exhaust gases to the atmosphere.

Referring to the condenser unit 14, it contains a cooling coil 84 adjacent the upper end thereof, which coil is in communication with a pump 86, the cooling coil 84 being used to condense the water vapor in the exhaust gases. In practice, we have successfully used a conventional aircraft oil cooler for this purpose.

A plurality of generally horizontally extending, vertically spaced baffle plates 88 are positioned below the coil 84, and, in the preferred construction are made of nickel. Adjacent one side of the plates 88 is a bank of nozzles 90 which is positioned to flush solid particles from the plates 88.

The bank of nozzles is connected to a pump 92 by a pipe 94, and the pump is connected to the radiator 18 by a pipe 96. In turn, the radiator 18 is connected to the storage tank 16 by a pipe 98. The tank 16 has a drain and valve 100, for a purpose to appear.

A pipe 102 connects the storage tank 16 with the filter 18, and the latter is connected to a sump 104 in the condenser 14 by a pipe 106. A pump 108 is contained in the pipe 102 for forcing the fluid through the filter 18 and into the storage tank 16.

When the auxiliary equipment is used in an automobile of conventional construction, the storage tank 16 can be supported under the hood adjacent to the engine, the fuel tank 25 is in its usual position at the rear of the vehicle, and the filter 18 and the condenser unit 14 can be placed in the trunk of the vehicle.

In operation, using conventional leaded gasoline and air as fuel which are mixed in the carburetor 22 and admitted to the combustion chambers in the conventional manner, the exhaust gases from the chambers pass into the tubes 38, through the metal screens 50, into the containers and over and around the charcoal pieces 52, in the tubes 58, through the second set of metal screens 68, and into the double-container 66 and over and around the charcoal pieces 70.

As will be discussed more fully hereinafter, a chemical analysis of the exhaust gases contained in the pipe 78 indicates that a chemical change occurs in the exhaust gases after they pass through the metal screens, over the charcoal, and through the condenser unit 14. It is suspected that the metal screens and the pieces of activated charcoal cause the carbon monoxide and carbon dioxide in the hot gases to be reduced to free carbon and oxygen.

The gases and fluids which leave the double-container 66, pass through the tubes 74, through the exhaust pipe 75, and into the condenser unit 14 through the inlet 76.

As the gases and fluids pass over and around the baffle plates 88, it appears that an additional chemical change may occur, and solid particles which are formed at that time or which are previously formed in the containers 48 and 66, are deposited on the baffle plates 88.

Water vapor which is contained in the exhaust gases is condensed on the cooling coils 84 and drops unto the plates 88.

Water from the radiator 18 flows through the pipe 96, the pump 92, the pipe 94 and the nozzles 90 and onto the plates 88 so as to flush the water droplets and solid particles therefrom, and into the sump 104.

From the sump 104, the liquid and solid particles pass through pipe 106, the pump 108, and into the filter 18, where the solid particles are removed. These solids include free carbon, sodium nitrate, and calcium nitrate.

it is indicated that a relatively large amount of methanol (wood alcohol) is contained in the fluid which drains from the condenser (particularly when the engine is running with a high back pressure), and glyoxal . . . possibly in the dihydrate form, which is soluable in hot water . . . is also contained therein. An appreciable amount of ammonia is also contained in the exhaust or produced in the condenser unit, and it apparently dissolves in the methanol and/or goes into solution with the water to form ammonium hydroxide.

The aforementioned liquid phase is forced through the pipe 102 by the pump 108, and into the storage tank 16.

Because methanol is a recognized anti-freeze, it is actually advantageous to have it remain in the liquid system, but because appreciable amounts of water and methanol are formed during the operation of the engine, it is advisable to periodically drain the excess liquid from the storage tank 16, through the valve 100.

Returning to a consideration of the gases which flow from the outlet 77 of the condenser unit 14, these flow through the pipe 78 and the valve 80, and into the fuel tube 30 below the carburetor 22.

We have discovered that the optimum operating characteristics of this novel engine are achieved when the valve 28 is open to admit a small amount of air into the pipe 30 upstream of the carburetor 22, and the vent valve 82 in the pipe 78 is opened to allow about twenty (20 percent) percent of the exhaust gases in the pipe 78 to be emitted to the atmosphere.

This results in approximately one hundred percent horsepower output, as compared with the normal operation of this same type of internal combustion engine, but without the condenser 14, the screens 50 and 58, and the pieces of activated carbon 52 and 70. However, as indicated above and as described more fully hereinafter, our novel engine emits only a small percentage of the exhaust gases to the atmosphere, and these contain practically no noxious or harmful pollutants.

We have operated the engine in the aforementioned manner for as long as six hours without stopping, and without any difficulty whatsoever. There is also no problem with starting the engine.

When the vent valve 82 in the pipe 78 is adjusted toward the closed position so that as little as five (5 percent) percent of the exhaust gases are vented to the atmosphere, the engine continues to operate satisfactorily, but the power output drops to approximately ninety (90 percent) percent of a conventional engine of the same type and size. However, it is obvious that this ten (10 percent) percent reduction in horsepower output as compared with the previously described engine is offset by a seventy-five (75 percent) percent reduction in exhaust emissions to the atmosphere.

If the vent valve 82 is completely closed so there is no emission of exhaust gases to the atmosphere, the engine will continue to operate so long as some additional air is admitted through the air intake 26. However, under such conditions it is advisable to partially close the valve 80 in the pipe 78 so as to increase the back pressure on the engine to about three to six pounds per square inch. Under these conditions, the horsepower output drops to about fifty (50 percent) percent of that of a conventional engine operating in the normal manner. We have also increased the back pressure on the engine to as high as 50 pounds per square inch, and it continued to operate satisfactorily.

We have learned that under all of the aforementioned operating conditions, it is helpful to adjust the valve 36 in the air inlet pipe 34 so as to admit a small amount of air below or downstream of the carburetor 22. This might be likened to a "tuning" or fine adjustment of the engine.

As mentioned hereinabove, we have been unable to ascertain the exact function of the metal screens in the exhaust tubes and the activated carbon over which the hot exhaust gases are passed, but the engine will not operate without them when all or a major proportion of the exhaust gases are recycled into the combustion chambers. On the other hand, the engine will operate for a short time without the condenser 14 (with the recycling of the exhaust gases), but it will eventually "choke up" on the water which is recycled into the combustion chambers. Thus, it appears that one of the primary functions of the condenser unit is to remove water from the exhaust, and, obviously, to also remove solid particles which are flushed into the sump and thereafter removed by the filter 18.

It will be readily apparent that a reduction of engine exhaust to the atmosphere to twenty (20 percent) percent or less of normal, without any loss of power output . . . as accomplished with our novel engine . . . is a considerable advance toward the complete elimination of the pollution of the atmosphere by internal combustion engines burning hydrocarbon fuels.

However, we have further discovered that the exhaust gases from our engine, which are emitted to the atmosphere through the vent valve 82, contain practically no noxious or harmful pollutants. Set forth below is an analysis of the exhaust gases in the pipe 78, with fifty (50 percent) percent of the exhaust gases being returned to the carburetor, with eighty (80 percent) being returned, and with one hundred (100 percent) being returned.

| Constituent | Mole Percent: 50% Recirculated | 85% Recirculated | 100% Recirculated |
|---|---|---|---|
| Hydrogen | 0.30 | 0.16 | 0.13 |
| Oxygen | 12.70 | 17.39 | 18.65 |
| Carbon Monoxide | 0.41 | 0.18 | 0.09 |
| Carbon Dioxide | 5.39 | 1.85 | 0.81 |
| Nitric Oxide | less than 5 ppm* | less than 5 ppm | less than 5 ppm |
| Total Hydrocarbon | 0.05 | 0.03 | 0.02 |
| Nitrogen | 79.21 | 78.96 | 78.40 |
| Argon | 0.90 | 0.90 | 0.89 |
| Water | 1.04 | 0.53 | 1.01 |

*Limits of Detection

It will be noted that as the percentage of the recirculated exhaust is increased, the amounts of carbon monoxide and carbon dioxide are materially decreased, and, in all instances, the amount of nitric oxide is below the limits of detection i.e. less than 5 parts per million. It is also believed to be significant that the limits for nitric oxide output for internal combustion engines of comparable size, sold in 1976, has been set at about 80 ppm. In short, our novel engine already exceeds such a requirement, with less than 5 ppm.

Thus, it is apparent that there has been provided a novel internal combustion engine with modified and controlled exhaust, which fulfills all of the objects and advantages sought therefore, and, in particular, which practically eliminates atmospheric pollution from internal combustion engines, without any loss in power output.

We claim:

1. An internal combustion engine assembly, comprising, in combination:
    an internal combustion engine including a combustion chamber, a fuel passageway for admitting a mixture of hydrocarbon fuel and oxygen into said chamber, means for igniting said mixture, and an outlet from the chamber for the products of combustion;
    a container adjacent to the combstion chamber outlet having an inlet and an outlet, and containing a quantity of activated carbon;
    an outlet passageway in communication with the combustion chamber outlet and the container inlet for channeling the products of combustion from said chamber and into the container;
    a metal screen extending transversely of the outlet passageway in close proximity with the combustion chamber outlet and through which the products of combustion must pass to enter said comtainer;
    an exhaust passageway in communication with the container outlet and with the fuel passageway at a juncture;
    means in the exhaust passageway for venting at least a portion of the products of combustion into the atmosphere;
    a condenser housing in the exhaust passageway having an inlet in communication with the container outlet and an outlet in communication with the fuel passageway;
    a plurality of spaced baffle plates in the condenser housing;
    a cooling coil within the condenser housing; and
    means in the housing for washing the surfaces of said plates.

2. An internal combustion engine assembly as described in claim 1, in which the metal screen is of wire mesh made from iron, nickel, chromium, monel, vanadium or stainless steel, or a mixture thereof.

3. An internal combustion engine assembly as described in claim 1, further including, in combination;
    a sump in the condenser housing for receiving liquids and any solid particles which may be washed from said baffle plates;
    a storage tank;
    a passageway for fluids between the sump and the storage tank; and
    filter means in said last-mentioned passageway for removing solids from any liquids which flow from the sump to the storage tank.

4. An internal combustion engine assembly as described in claim 3 in which the means for washing the surfaces of the baffle plates includes a set of nozzles which is in fluid communication with the storage tank.

5. An internal combustion engine as described in claim 1, further including a carburetor in the fuel passageway downstream of the juncture.

6. An internal combustion engine as described in claim 5, further including, in combination:
    a controlled primary air inlet in communication with the fuel passageway, upstream of the carburetor; and
    a controlled secondary air inlet in communication with the fuel passageway, downstream of the carburetor.

7. An internal combustion engine as described in claim 1, in which the venting means in the exhaust passageway is arranged to vent to the atmosphere, about twenty percent of the products of combustion.

* * * * *